(12) United States Patent (10) Patent No.: US 7,841,848 B2
Tatham (45) Date of Patent: Nov. 30, 2010

(54) ROLLED FOOD PRODUCT AND APPARATUS

(76) Inventor: Warren Tatham, 40 Cambrian Street, Johnsonville, WE (NZ)

(*) Notice: Subject to any disclaimer, the term of this patent is extended or adjusted under 35 U.S.C. 154(b) by 987 days.

(21) Appl. No.: 11/460,239

(22) Filed: Jul. 26, 2006

(65) Prior Publication Data

US 2007/0034094 A1 Feb. 15, 2007

Related U.S. Application Data

(60) Provisional application No. 60/706,975, filed on Aug. 10, 2005.

(51) Int. Cl.
*A23P 1/00* (2006.01)
(52) U.S. Cl. .................. 425/188; 425/408; 425/438; 425/442; 426/512
(58) Field of Classification Search ............. 425/182, 425/188, 194, 408, 438, 441–442; 426/115, 426/132, 134, 512, 517
See application file for complete search history.

(56) References Cited

U.S. PATENT DOCUMENTS

| | | | | |
|---|---|---|---|---|
| 3,262,404 A | * | 7/1966 | Morz et al. | .................. 425/183 |
| 3,679,167 A | * | 7/1972 | Jupiter et al. | ............... 249/173 |
| RE28,106 E | * | 8/1974 | Lee | ............... 425/89 |
| 3,943,602 A | * | 3/1976 | Siclari | ............... 425/338 |
| 5,634,396 A | | 6/1997 | Isobe et al. | |
| RE35,577 E | * | 8/1997 | Coleman | ............... 426/134 |
| 5,658,608 A | * | 8/1997 | Klefbeck | ............... 426/512 |
| 5,832,813 A | | 11/1998 | Shimazu | |
| 5,870,948 A | * | 2/1999 | Ono | ............... 425/383 |
| 5,910,208 A | * | 6/1999 | Ono | ............... 425/308 |
| 6,465,038 B2 | * | 10/2002 | Aoki | ............... 426/512 |
| 6,701,828 B1 | * | 3/2004 | Burns et al. | ............... 425/376.1 |

FOREIGN PATENT DOCUMENTS

| | | |
|---|---|---|
| AU | 2003200236 A1 | 8/2003 |
| EP | 000386891-0001 | 11/2005 |
| EP | 000386891-0002 | 11/2005 |
| EP | 000386891-0003 | 11/2005 |
| EP | 000386891-0004 | 11/2005 |
| NZ | 402394 | 2/2002 |
| NZ | 402395 | 2/2002 |
| NZ | 525862 | 7/2003 |
| NZ | 541730 | 1/2006 |
| NZ | 516910 | 7/2006 |
| WO | 9806311 A1 | 2/1998 |

OTHER PUBLICATIONS

Fumihiko, English Translation of the Abstract of JP 55085368, Jun. 27, 1980.

* cited by examiner

*Primary Examiner*—Richard Crispino
*Assistant Examiner*—Thu Khanh T Nguyen
(74) *Attorney, Agent, or Firm*—D. Austin Bonderer

(57) ABSTRACT

An apparatus for preparing a rolled food product, such as sushi. The apparatus has a container having a first end and a second end, wherein at least the first end has one aperture. The container is positionable between a closed position, defining a hollow interior space, and an open position, presenting a plurality of cavities. Each of the cavities can receive food material such as rice. There is also a plunger assembly that passes the aperture when the container is in the closed position. The plunger assembly is then used to compress the food material in the hollow interior space to form a roll having a desired consistency.

28 Claims, 5 Drawing Sheets

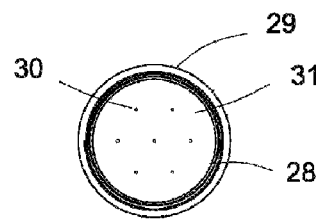 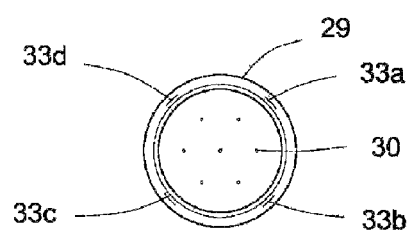 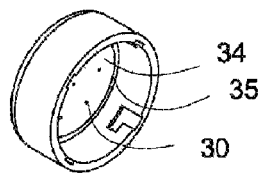
Fig 5  Fig 6  Fig 7
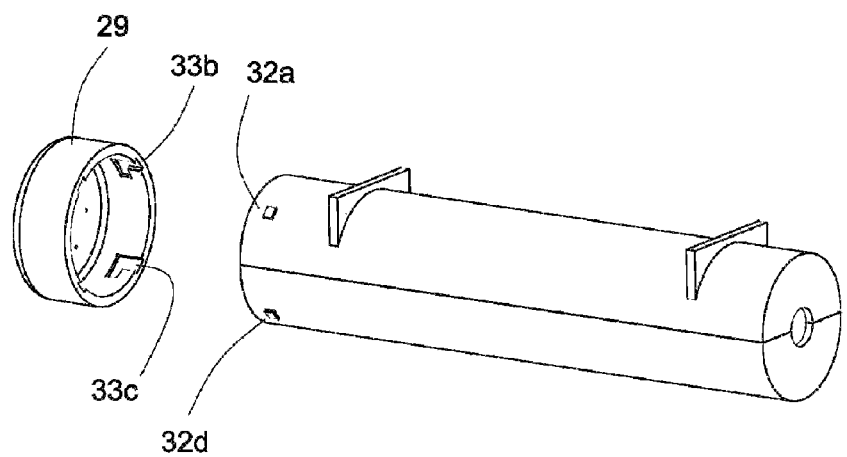
Fig 8

ROLLED FOOD PRODUCT AND APPARATUS

CROSS REFERENCE TO RELATED APPLICATIONS

This application claims the benefit of U.S. Provisional Application No. 60/706,975, filed Aug. 10, 2005, which is entitled "Rolled Food Product and Apparatus," which is incorporated by reference.

FIELD OF INVENTION

This invention relates to a food preparation device. More particularly the invention relates to a manually operated device adapted for the preparation of sushi or the like.

BACKGROUND

Sushi is a Japanese food with over a thousand years of history and tradition. It has become the most visible example of Japanese cuisine in New Zealand and other Western Countries.

Sushi began as a way of preserving fish. The raw, cleaned fish was pressed between rice and salt by a heavy stone for a few weeks. After this period, the stone was removed and replaced with a light cover. A few months after that, the fermented fish and rice were considered ready to eat.

It was not until the 18th Century that a chef by the name of Yohei decided to serve sushi in its present form. He eliminated the fermentation process altogether. It is said that the use of rice wine vinegar is reminiscent of the earlier fermentation tradition.

Sushi comes in at least three forms. An Osaka variation, which is probably the more elaborate form, is prepared traditionally by pressing rice in wooden boxes. The more familiar form of sushi to Westerners comes from Edo, the old name for Tokyo, and consists of hand-rolled rice. This particular style is called nigiri sushi.

Maki sushi is the form of sushi most familiar to us. Maki sushi is a "rolled sushi" with narrow strips of different ingredients (seafood, meat, chicken, crisp vegetables, or pickles) layered on a bed of vinegar rice and spread on a sheet of nori or seaweed. This form of sushi is very popular because it can be tailored to suit a variety of tastes where just about any ingredient can be rolled into the centre from crisp vegetables, strips of fish, meat, chicken, egg or even avocado.

Although sushi is now very popular with Europeans, no easy way has been devised to make what is essentially a very simple product. Sushi is after all just strips of fish, or even meat rolled in rice and wrapped in crisp, thin sheets of dried seaweed or nori. The filling generally also contains wasabe (Japanese horseradish), usually as a paste, although this is not necessary.

As intimated earlier although sushi is a simple dish it is extra-ordinarily difficult and messy to properly prepare. There has been a long felt need to be able to prepare sushi quickly, with a minimum of mess and with a consistent size and texture. The foregoing invention attempts to overcome the above disadvantages, and to provide an apparatus which is durable in construction, reliable and efficient in operation, easy to clean, and relatively simple and inexpensive to manufacture and assemble.

BRIEF SUMMARY OF THE INVENTION

It is an object of this invention to provide an improved apparatus and/or method for preparing rolled food products and more particularly for the preparation of sushi, or one, which at least will provide the public with a useful choice.

In a first aspect of the invention there is provided for an improved apparatus for preparing a rolled food product, the apparatus comprising:

(i) a hollowed container having a fixed closed end and an open end, the closed end having recesses forming an aperture about its centre, the container being separable, in an open position, such that a plurality of cavities is formed, the cavities being adapted to accommodate food material, and (ii) a rod or piston means configured to fit the recesses or aperture and for its suitability to compress the food product to form a roll having a desired consistency.

Preferably, the apparatus further comprises a removable end cap adapted to fit to the open end of the container when in a closed position.

Preferably, the removable end cap is fitted to the open end of the container by any suitable means such as a twist lock arrangement, a combination thread/ferule fitting, a slot/pin attaching means, or a snug cap-to-cylinder resistance type of fit.

Preferably, the removable cap has one or more bleeder holes of sufficient diameter to allow air to be expelled thus reducing or eliminating air pockets and providing for a food roll of superior consistency. Further, the air holes preferably, prevent a build up excessive air pressure within the container.

Preferably, the piston means comprises a rod portion and a head portion, the head portion being of a size sufficient to provide a snug fit within the container when in a closed position.

Preferably, the piston means is an elongate rod with a disc or stopper located adjacent to one end, the length of the rod or piston being sufficient to extend along the longitudinal axis of the container and beyond.

Preferably, the piston means has a handle.

Preferably, the piston means and the aperture formed by the recesses at the fixed closed end have complementary mated screw threads such that as the rod is turned the piston is advanced and the food product compressed.

Preferably, the screw thread located on the rod portion of the piston is of sufficient length to provide for both compression of the food product when the end cap is attached and thereafter, on removal of the end cap, to allow the food product to be extruded from the open end as a roll.

Preferably, the container, removable end cap and rod or piston are constructed of a material which is easy to clean such as stainless steel, a composite material or a plastic material.

Preferably, the container when opened divides into two halves, the separate halves being attached by a hinge means such as a clip/latch hinge, a groove and lip arrangement, a plastic flexure hinge, or an integrally moulded fold line along its longitudinal axis.

Preferably, the container is provided with a support means such as feet or legs, and preferably wherein each of said halves has feet or legs.

In a second aspect the invention provides for a kit of parts, the kit including the individual components comprising the apparatus according to any one of the foregoing aspects. In particular, individual parts comprising the apparatus includes but is not limited to:

(i) a container, separable into portions, having one fixed closed end and an open end, (ii) a piston means with or without a screw thread and/or handle, and (iii) an end cap which is attachable to the container when in a closed position.

In a third aspect of the invention there is provided an improved method of preparing a rolled food product the method comprising:

(i) opening the container portion of the apparatus according to any one of the preceding Claims to expose a plurality of cavities, (ii) filling the cavities with a desired food material such as rice, vegetables, meat, sponge or potato, to a level approximately equal to the high edge of the opened container sides, (iii) optionally tamping down the food material with the rod or piston by slotting the rod or piston in the recess(es) to form a channel, (iv) optionally withdrawing the rod or piston, (v) optionally filling the channel with a suitable filling such as fish, meat, vegetables or wasabe, (vi) placing the piston inside the container at the closed end, (vii) combining the cavities together to reform the container into its closed position, (viii) pressing the piston through the aperture of the now filled and closed container to compress the contents into a firm roll, (ix) attaching the removable end cap to the open end of the now filled container, pressing or turning the rod portion of the piston to compress the food product held within the container into a roll, (x) detaching the end cap, and (xi) extruding the compressed roll out of the open end of the container, and if appropriate depending on the food product, and optionally (xii) laying out a sheet of suitable wrapping or envelope material such as pastry or crisp seaweed (nori), transferring the packed contents of the filled container onto the wrapping material, (xiii) folding the wrapping material about the food material and optionally slicing the wrapped food material into desired sized slices.

In a fourth aspect, the invention provides for an apparatus for preparing a rolled food product, the apparatus comprising:

a hollowed container, said container having two closed ends, optionally each of said closed ends having apertures about their centre, the container being such that a plurality of cavities is formed when in an opened position, said cavities being adapted to accommodate food material, and wherein the aperture form recesses, said recesses capable of housing a rod or piston; and optionally further comprises a rod or piston and/or optionally a removable barrier means.

Preferably, the container when opened forms two cavities.

Preferably, the container when opened divides into two halves which remain attached along the hinge line.

Preferably, the container is provided with a support means such as feet or legs.

Preferably, each of said halves has feet or legs.

Preferably, the container has closed ends having apertures about their centre and wherein in one closed end the aperture forms a recess, said recesses capable of housing a rod or piston; and wherein the other closed end, the apertures are of sufficient diameter to expel air.

Preferably the container has raised stops enabling the piston to move a predetermined distance.

Preferably, the container has a hinge means about its longitudinal central axis.

Preferably, the container, removable barrier, and rod or piston are constructed of a material which is inexpensive to manufacture and easy to clean, such as a plastic material.

Preferably, the hinge means may be bolted or screwed, adhered or welded, or integrally molded with the container about its longitudinal axis.

Preferably, the hinge means are plastic, flexure hinges.

Preferably, the removable barrier means is removably attached to the container via a flexible cord or chain.

Preferably, the hinge means is/are aligned off-centre such that a bi-stable spring action is effected, enabling easy opening and closing of the container.

Preferably, the rod or piston is an elongate rod with a disc or stopper located adjacent to one end, the length of the rod or piston sufficient to extend along the longitudinal axis of the container and beyond.

Preferably, the food product is a sponge roll, or vegetable roll, a meat roll or the like.

Preferably, the food product is sushi.

Preferably, the food product is a jam, ice cream roll or cream roll.

Preferably, the food product is a biscuit mix.

Preferably, the food product is a meat roll, such as a mincemeat or sausage meat roll.

In a fifth aspect, the invention provides a method of preparing a rolled food product comprising:

opening the apparatus as described above, filling the cavities with food material such as rice, vegetables, meat, sponge or potato, to a level approximately equal to the high edge of the opened container sides, tamping down the food material with the rod or piston by slotting the rod or piston in the recess(es) to form a channel, withdrawing the rod or piston, filling the channel with a suitable filling such as fish, meat, vegetables, wasabe, or the like, optionally inserting a removable barrier means such as disc at one end of the filled cavity, said disc comprising an aperture at its centre of a diameter sufficient to expel trapped air, placing the piston inside one end of a cavity, combining the cavities together to reform the container into its closed position, pressing the piston through the aperture of the now filled and closed container to compress the contents into a firm roll, and if desired laying out a sheet of suitable wrapping or envelope material such as pastry or crisp seaweed (nori), transferring the packed contents of the filled container onto the wrapping material, folding the wrapping material about the food material and optionally slicing the wrapped food material into desired sized slices.

Preferably, the food material is rice.

Preferably, the wrapping material is nori.

Preferably, the filling material is fish slices or similar filling material such as vegetables, dressings or meat, and/or wasabe or the like.

The reader will of course realise that products of similar construction to sushi with similar difficulties in preparation will also fall under the umbrella of this invention. Such products contemplated include, but are not limited to, sponge rolls, meat rolls, ice cream rolls, vegetable rolls, pastry rolls and the like. In fact almost any food product containing an inner roll of material and an outer jacket, casing or envelope will fall within the scope of this invention.

Preferred forms of the invention will now be described with reference to the following Figures and Examples.

The foregoing examples are illustrative only and, where specific integers are mentioned which have known equivalents, such equivalents are deemed to be incorporated herein as if individually set forth.

BRIEF DESCRIPTION OF THE DRAWINGS

FIGS. 1-12 are schematic views illustrating preferred embodiments of the first aspect of the invention.

FIG. 1 shows a food rolling apparatus in an open position without an end cap FIG. 2 shows a food rolling apparatus in a closed position without an end cap and wherein the rolled food product is also illustrated.

FIG. 3 shows a food rolling apparatus in closed position with end cap attached.

FIG. 4 shows a food rolling apparatus wherein the end cap is removed and the screw thread attachment means highlighted.

FIGS. 5-7 shows alternative end cap arrangements.

FIG. 8 shows a food rolling apparatus with end cap removed, the end cap attachment means being by way of a twist lock arrangement.

FIG. 9 illustrates the food rolling apparatus without end cap attached but with screw threaded piston in operating position.

FIG. 10 as for FIG. 9 and showing the clip attachment locking the two portions of the container in place.

FIG. 11 illustrates a further version of the food rolling apparatus. This time in open position showing piston, click fit catches and support feet.

FIG. 12 illustrates the recesses forming the aperture, the recesses having screw threads.

DETAILED DESCRIPTION OF THE INVENTION

The Schedule of items to which Examples 1-3 relate can be found immediately after the preferred method of use, the subject of Example 4.

Example 1

Figure 1:
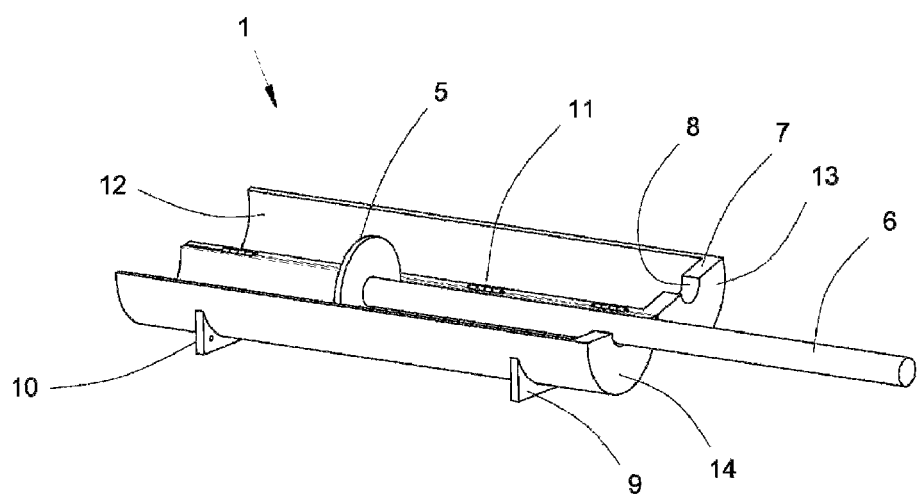
Figure 2:
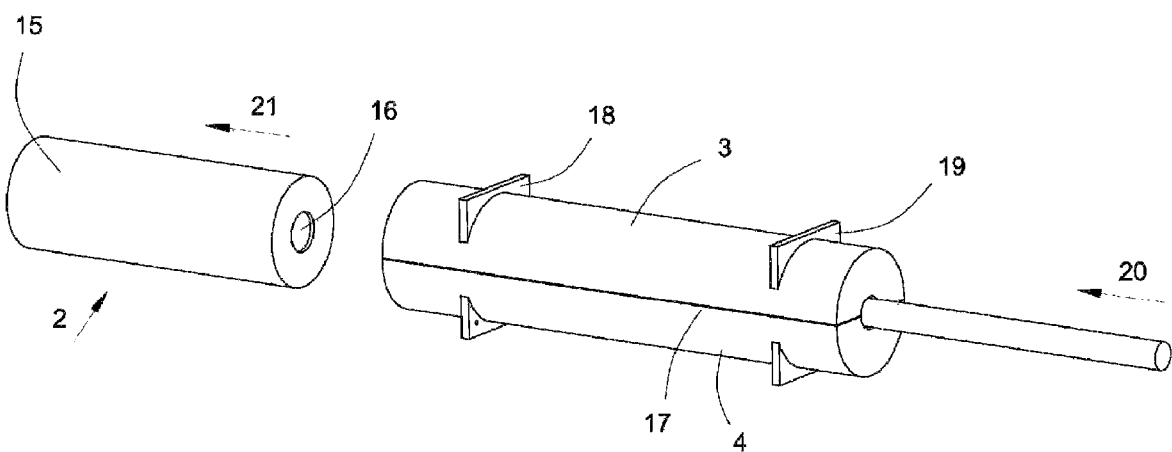

Referring now to FIGS. 1-2 this example illustrates the food rolling apparatus in a basic form wherein only one end of the container is permanently fixed or closed and the rolled food product is extruded by pressing the piston through the filled cavity. In this embodiment, mould assembly (1) having an upper mould and lower mould case (3,4) is shown in an open position (FIG. 1) with piston platen (5) and rod (6) (the piston), seated within the mould assembly and resting on a recess complementary to recess (8). End wall (7) is coupled with upper and lower end plates (13,14). The mould assembly has an open end (12) from which rolled food product (2) once compressed by the piston is delivered in extruded and consistent form. The upper and lower mould casings are coupled by hinge (11). Supporting feet (9,10,18,19) are located on both the upper and lower mould cases and allow the substantially cylindrical mould assembly to be filled more easily.

Example 2

Figure 3:
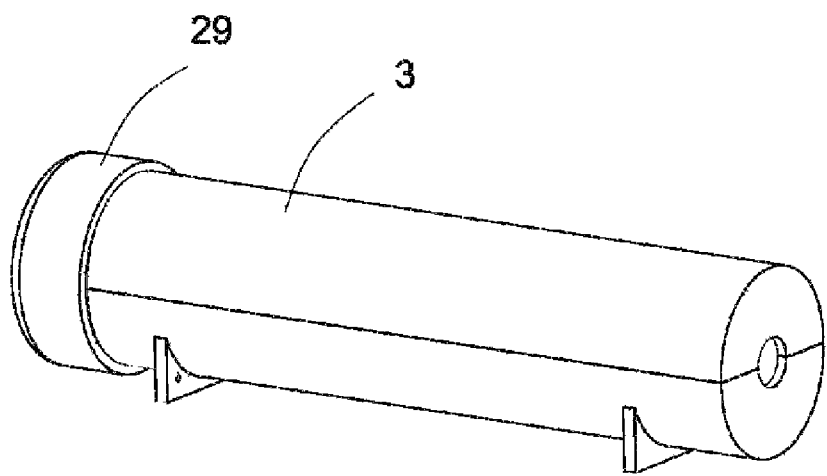
Figure 4:
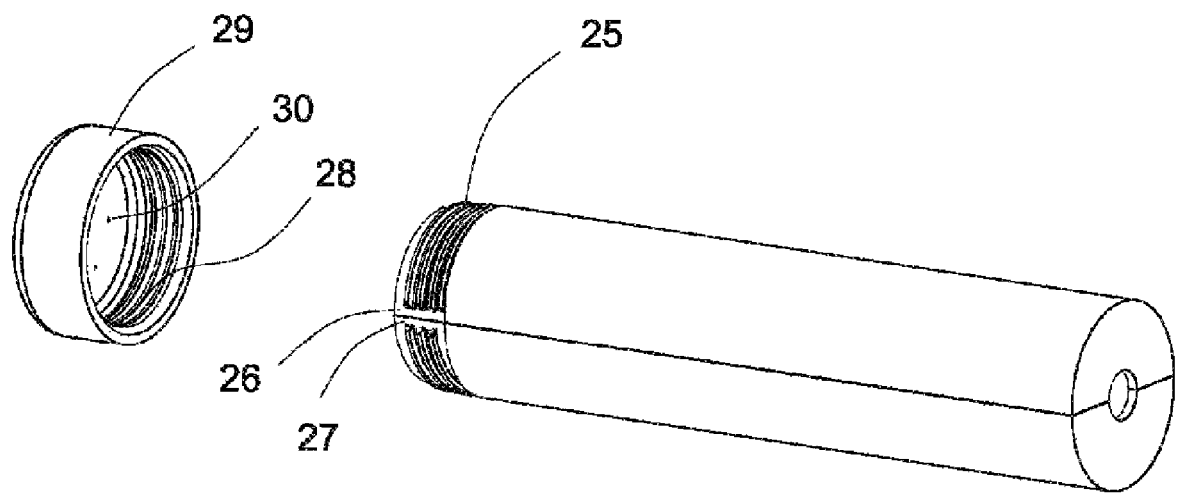
Figure 9:
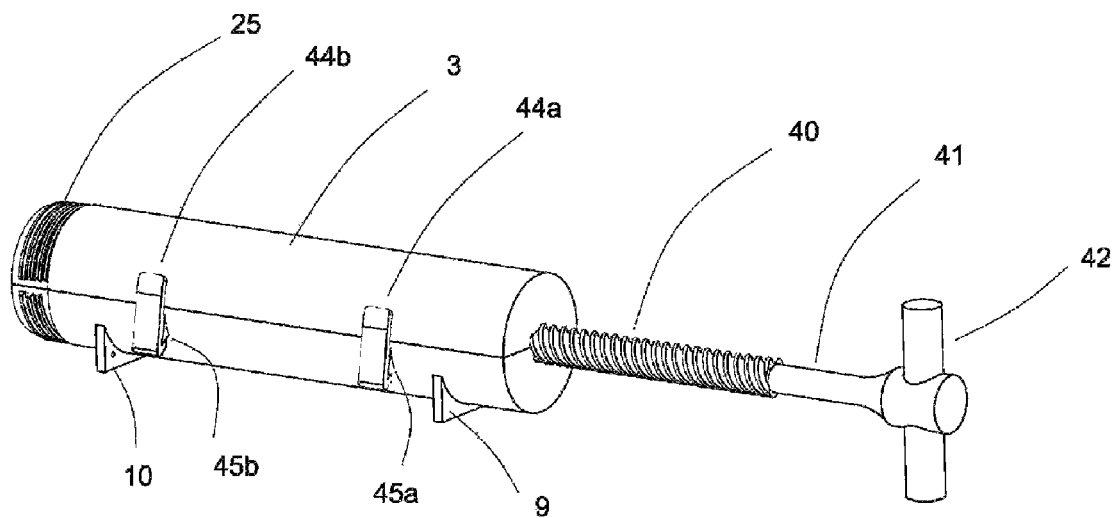
Figure 10:
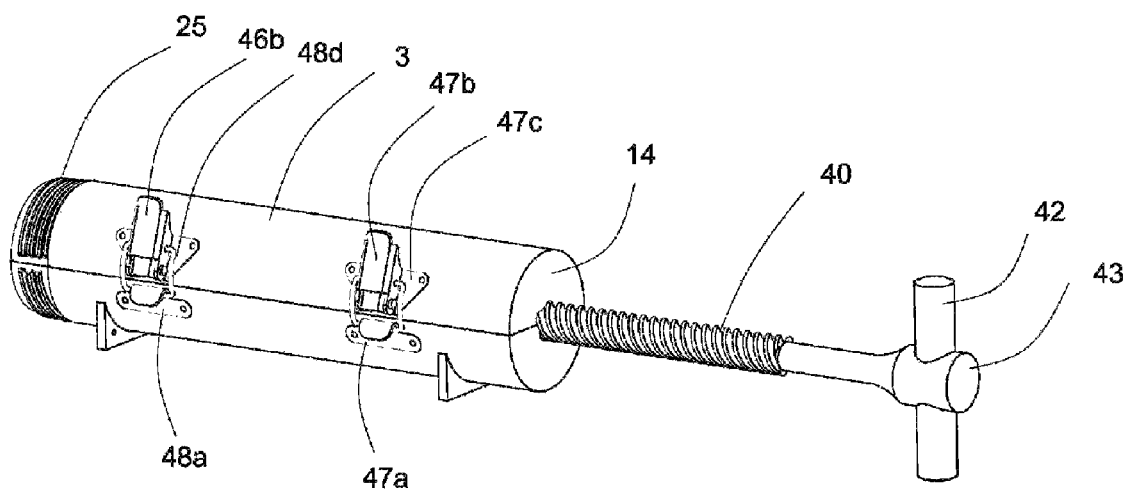
Figure 11:
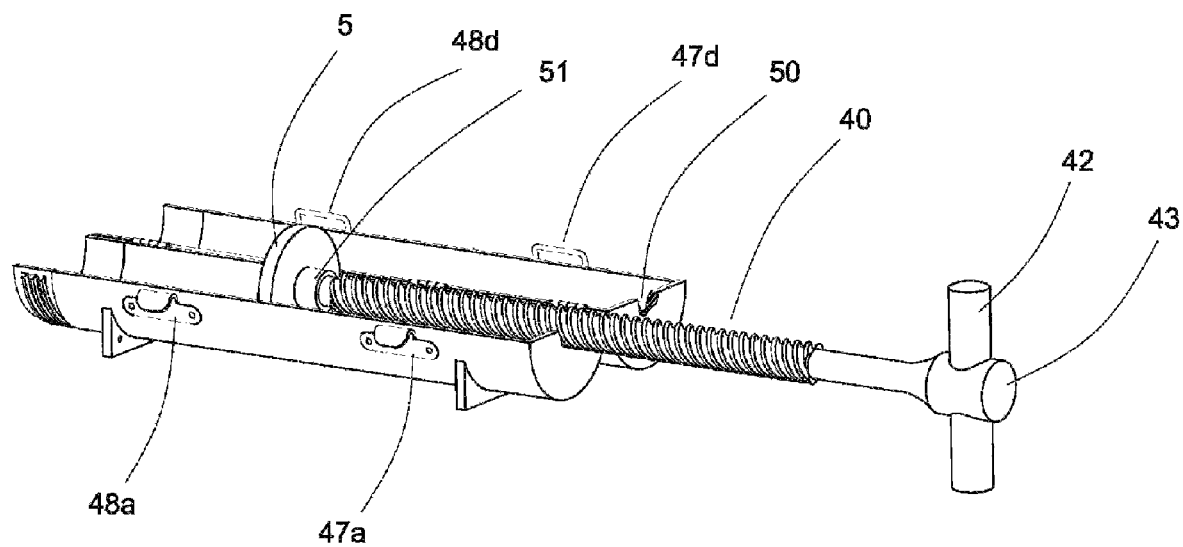
Figure 12:
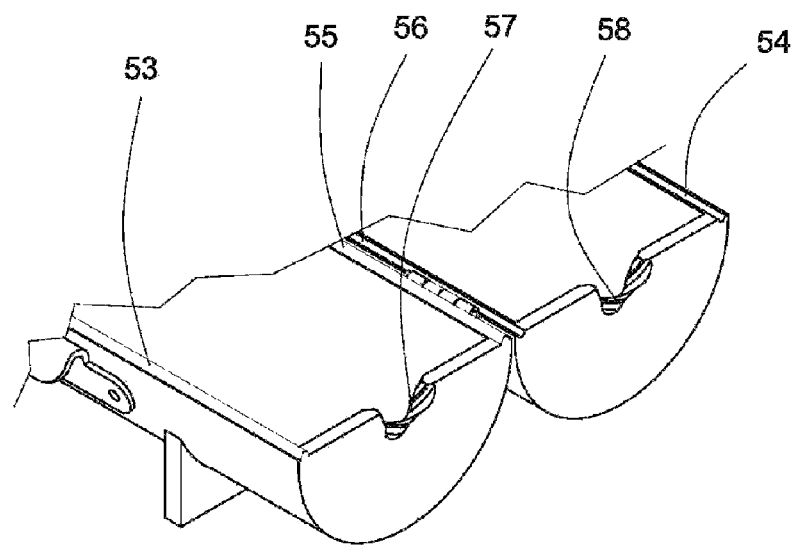

FIGS. 3-8 illustrate preferred methods for attaching a removable end cap to the closed (and filled) mould assembly, or in a form suitable for storage when not in use. In FIGS. 3-5 the end cap (29) is attached to the mould assembly by complementary screw threads (25,26,27,28) located as illustrated. Bleeder holes (30) allow air to be released during compression of the food product.

FIGS. 6-8 show an alternative twist/lock attachment means whereby lug locking slots (33*a*,*b*,*c*,*d*) protruding from the internal face of the end cap (29) are rotated to snap fit with lugs (32) on the Mould assembly cases.

Example 3

Referring to FIGS. 9-12, the piston rod has an external screw (40) located along and around a substantial portion of the shank of the piston (41). The piston has a handle (42,43), which the user will rotate, to a first position until substantial resistance occurs indicating that the rice has been suitably compressed. The end cap is then removed and the piston further rotated until all of the contents are extruded and made available to be eaten or further processed. FIGS. 9-12 also illustrate latch fittings (44,45,46,47,48) by which the upper and lower mould cases are coupled.

Preferred Modes of Use

Example 4

Instructions for use:
1. With the two halves of the former (mould assembly) opened out, cooked sticky rice is placed in both cavities to more or less fill both parts. The sticky rice will hold its shape at the open end of the cylinder during this phase.
2. The long rod portion of the piston is used to create a channel in the rice in both cavities.
3. Fillings to suit are placed in the channels.
4. Once the ingredient filling has been added, the piston is placed on the inside face of the end plate and the two halves of the former closed together to form a closed cylinder that is secured by clips.
5. The removable end cap is then coupled to the open end of the tube and secured by a twist lock or similar to prevent the cap from detaching from the tube. This prevents rice and filling from escaping from the tube during the compaction phase. The securing method could be a thread or ferule arrangement, or a slot/pin with a twist to lock action.
6. With the end cap secured, the piston rod is pushed or screwed a short distance (about 20-25 mm) into the cylinder to compact the rice and filling mix. In a preferred form the rod and fixed end plate have mating threads allowing the rod to be turned and advanced into the cylinder to initially compact the rice and filling mix. Compaction is deemed to be complete when substantial resistance to any further turning is felt.
7. Once firm resistance to the piston is detected, the end cap can be removed and the rod arrangement then turned further to continue the advance of the rod/piston into the cylinder. This action drives the formed plug of rice and filling from the now open end (cap removed) of the former. If this is done with care a neat plug of rice with filling is extruded. If the operator works with the open end close to a flat surface the roll can be set onto that surface. Once completely free of the former the roll can then be placed onto the roller device as described and claimed in NZ 516910 and the nori rolled over the plug.

8. The two features that distinguish the improvement or modification over the main patent relate to the removable end cap and the use of a threaded rod to force the roll from the cylinder. Likewise, the mode of operation relating to the improvement or modification differs from the main patent in that instead of opening the two cavities out to remove the roll, the two halves of the former remain clamped until the formed roll has been fully extruded from the former device.

9. For the fixed end cap each half of the end plate includes a threaded section, such that when the cavity is closed and clamped, the "nut" is complete and provides a complete thread through which the rod can then be turned to advance it and the piston along the cylinder. In one embodiment a handle is incorporated on the rod to make the turning function easier.

Item Schedule

| | |
|---|---|
| 1 | mould assembly |
| 2 | product |
| 3 | upper mould half case |
| 4 | lower mould half case |
| 5 | piston head |
| 6 | piston rod |
| 7 | end plate half wall |
| 8 | piston rod bearing |
| 9 | lower half case foot |
| 10 | lower half case foot |
| 11 | hinge |
| 12 | mould case open end |
| 13 | upper mould end plate |
| 14 | lower mould end plate |
| 15/16 | product/filling |
| 17 | mould parting line |
| 18 | upper feet (optional) |
| 20 | rod movement |
| 21 | extruded product |
| 25 | mould end external thread |
| 26 | upper external thread cut back |
| 27 | lower external thread cut back |
| 28 | cap internal thread |
| 29 | end cap |
| 30 | air release vent holes |
| 31 | cap end wall |
| 32 | lugs |
| 33 | lug locking slots |
| 34 | raised end cap face |
| 35 | end cap sealing ring |
| 40 | piston external screw (optional) |
| 41 | piston shank |
| 42 | handle |
| 43 | handle head |
| 44 | resilient latch |
| 45 | catch |
| 46 | over-centre latch |
| 47 | over-centre latch |
| 48 | latch wire |
| 50 | internal screw bearing |
| 51 | rotary journal |
| 53 | mould side sealing ridge |
| 54 | mould side sealing trough |
| 55 | mould side sealing ridge |
| 56 | mould side sealing trough |
| 57 | lower screw half bearing |
| 58 | upper screw half bearing |

Variations

The skilled reader will instantly realise that the present innovation may have one or more features that are common to the trade that may be replaced, added to or deleted without departing from the scope of the invention. For example, the method of attaching the end cap to the container may vary as the way the two "halves" of the shell casing are brought or hinged together.

Further, the innovation may also broadly be said to consist in the parts, elements and features referred to or indicated in the specification of the application, individually or collectively, and any or all combinations of any two or more of the parts, elements or features and where specific integers are mentioned herein which have known equivalents such equivalents are deemed to be incorporated herein as if individually set forth.

Throughout the description and claims of this specification the word "comprise" and variations of the word, such as "comprises" and "comprising", are not intended to exclude other additives, components, integers or steps.

Also throughout the description references to rod or piston refers an integer that enables a user to create a channel in the food mixture to accommodate fillings, if desired, and also to compress and extrude the food roll. In many instances the rod or piston will have a shaft portion and a disc or head portion configured to fit snugly within the container.

It will of course be realised that while the foregoing has been given by way of illustrative example of this invention, all such and other modifications and variations thereto as would be apparent to persons skilled in the art are deemed to fall within the broad scope and ambit of this invention as is herein set forth and claimed in the following claims.

The invention claimed is:

1. An apparatus for preparing a rolled food product, the apparatus comprising:
(i) a container having a first end and a second end, at least the first end having an aperture, the container being positionable between a closed position defining a hollow interior space and an open position presenting a plurality of cavities, each cavity adapted to receive food material therein;
(ii) a plunger assembly configured to pass through the aperture when the container is in the closed position and compress the food material when present in the hollow interior space to form a roll having a desired consistency; and
(iii) a removable end cap having a top wall and an annular side wall extending down from said top wall and having an inwardly extending thread for cooperation with an external thread on and adjacent the second end of the container, wherein the end cap is adapted to be removably coupled to the second end of the container.

2. The apparatus as claimed in claim 1, wherein the removable end cap has one or more bleeder holes of sufficient diameter to allow air to be expelled while the roll is compressed during operation thus reducing or eliminating air pockets in the roll.

3. The apparatus as claimed in claim 2, wherein the bleeder holes are adapted to prevent a build up of excessive air pressure within the container during compression of the roll during use.

4. The apparatus as claimed in claim 1, wherein the plunger assembly comprises a rod portion and a head portion, the head portion being of a size sufficient to provide a snug fit within the hollow interior space of the container when the container is in the closed position.

5. The apparatus as claimed in claim 1, wherein the elongate rod has a disc or stopper located adjacent to one end and wherein a length of the elongated rod is greater than a length of the container.

6. The apparatus as claimed in claim 5, wherein the plunger assembly includes a handle.

7. The apparatus as claimed in claim 1, wherein the container and plunger assembly are substantially constructed of a material selected from a group consisting of a stainless steel material, a composite material, and a plastic material.

8. The apparatus as claimed in claim 1, wherein the container when in the open position comprises two halves pivotally coupled to one another by a hinge mechanism.

9. The apparatus as claimed in claim 8, wherein the container includes a support assembly having one or more support legs for supporting the container upon a surface.

10. The apparatus as claimed in claim 8, wherein each of said two halves of the container has one or more support legs for supporting the container upon a surface.

11. An apparatus for preparing a rolled food product, the apparatus comprising:
(i) a container defining an interior space, said container having two ends;
(ii) wherein each of said ends has an aperture;
(iii) wherein the container has a closed position defining the interior space and an open position presenting a plurality of cavities, said cavities being adapted to accommodate food material;
(iv) a plunger assembly having a head portion adapted to sweep at least partially through the interior space and an elongate rod coupled to the head portion for driving the head portion through the interior space, the elongate rod having a length exceeding a length of the container;
(v) wherein at least a portion of each of the apertures are adapted to simultaneously receive the rod when the container is in the open position, and the plunger assembly and the aperture in the first end have complementary mated threads such that as the elongate rod is turned, the plunger assembly is advanced through the hollow interior space to compress the food material when present in the hollow interior space;
(vi) wherein a removable end cap having a top wall and an annular side wall extending down from said top wall and having an inwardly extending thread for cooperation with an external thread on and adjacent the second end of the container, wherein the end cap is adapted to be removably coupled to the second end of the container.

12. The apparatus as claimed in claim 11, wherein the container when in the open position presents two cavities, each cavity having substantially a shape of a half cylinder.

13. The apparatus as claimed in claim 12, wherein the container when in the open position comprises a first half of the container hingedly coupled to a second half of the container.

14. The apparatus as claimed in claim 13, wherein the container includes a support assembly having one or more legs for supporting the container upon a surface.

15. The apparatus as claimed in claim 14, wherein the first and second halves each have one or more legs for supporting the container upon a surface.

16. The apparatus as claimed in claim 15, wherein the aperture associated with one of the closed ends is capable of receiving said rod and the aperture of the other closed end has if of sufficient diameter to expel air.

17. The apparatus as claimed in claim 11, wherein the container has raised stops disposed in the interior space of the container for preventing the rod from moving more than a predetermined distance in the interior space.

18. The apparatus as claimed in claim 11, wherein the container has a hinge assembly disposed oriented parallel to a longitudinal central axis of the container for pivotally coupling a first part of the container to a second part of the container.

19. The apparatus as claimed in claim 11, wherein, the container and the elongaged rod are constructed of a plastic material.

20. The apparatus as claimed in claim 18, wherein the hinge assembly is bolted or screwed, adhered or welded, or integrally molded with the container.

21. The apparatus as claimed in claim 20, wherein the hinge assembly comprises a plastic, flexure hinge.

22. The apparatus as claimed in claim 11, wherein a removable barrier is removably attached to the container via an elongate flexible element.

23. The apparatus as claimed in claim 11, wherein the elongate rod with a disc or stopper located adjacent to one end, and wherein a length of the rod is greater than a length of the container.

24. The apparatus as claimed in claim 23, wherein the rolled food product is a sponge roll, or vegetable roll, or a meat roll.

25. The apparatus as claimed in claim 23, wherein, the food product is sushi.

26. The apparatus as claimed in claim 23, wherein the food product is a jam, ice cream roll or cream roll.

27. The apparatus as claimed in claim 23, wherein the food product is a biscuit mix.

28. The apparatus as claimed in claim 23, wherein, the food product is a meat roll, such as a mincemeat or sausage meat roll.

* * * * *